United States Patent
Fukumoto

(10) Patent No.: US 8,503,089 B2
(45) Date of Patent: Aug. 6, 2013

(54) OCULAR LENS AND OPTICAL APPARATUS INCLUDING OCULAR LENS

(71) Applicant: Nikon Vision Co., Ltd., Tokyo (JP)

(72) Inventor: Satoshi Fukumoto, Yokohama (JP)

(73) Assignee: Nikon Vision Co., Ltd., Tokyo (JP)

( * ) Notice: Subject to any disclaimer, the term of this patent is extended or adjusted under 35 U.S.C. 154(b) by 0 days.

(21) Appl. No.: 13/656,827

(22) Filed: Oct. 22, 2012

(65) Prior Publication Data

US 2013/0107374 A1 May 2, 2013

Related U.S. Application Data

(63) Continuation of application No. PCT/JP2011/059672, filed on Apr. 20, 2011.

(30) Foreign Application Priority Data

Apr. 21, 2010 (JP) ................. 2010-097552

(51) Int. Cl.
  *G02B 25/00* (2006.01)
(52) U.S. Cl.
  USPC ............................ 359/643; 359/645; 359/646
(58) Field of Classification Search
  USPC ............. 359/643, 644, 645, 646, 647
  See application file for complete search history.

(56) References Cited

U.S. PATENT DOCUMENTS

| 5,579,167 | A | 11/1996 | Oomura et al. |
| 5,659,422 | A * | 8/1997 | Fukumoto ............ 359/644 |
| 6,962,447 | B2 * | 11/2005 | Ogata ................. 396/354 |
| 7,391,968 | B2 * | 6/2008 | Takato ................ 396/386 |
| 7,542,670 | B2 * | 6/2009 | Takato ................ 396/386 |

FOREIGN PATENT DOCUMENTS

| JP | 06-175047 A | 6/1994 |
| JP | 07-063996 A | 3/1995 |
| JP | 11-095130 A | 4/1999 |
| JP | 2003-121760 A | 4/2003 |

* cited by examiner

*Primary Examiner* — Scott J Sugarman
(74) *Attorney, Agent, or Firm* — Miles & Stockbridge P.C.

(57) ABSTRACT

An ocular lens used in an optical apparatus, such as a telescope optical system, includes the following lens groups sequentially arranged from the object side: a first lens group G1 having negative refracting power; a second lens group G2 including a lens component having a convex surface facing the viewer's eye side; and a third lens group G3 having positive refracting power. An object-side focal plane of the third lens group G3 is located between the second lens group G2 and the third lens group G3. The first lens group G1 includes the following lens components sequentially arranged from the object side: a first lens component G1A having a convex surface facing the object side, having negative refracting power, and having a meniscus shape; and a second lens component G1B having negative refracting power.

12 Claims, 11 Drawing Sheets

OCULAR LENS AND OPTICAL APPARATUS INCLUDING OCULAR LENS

TECHNICAL FIELD

The present invention relates to an ocular lens and an optical apparatus including the ocular lens.

BACKGROUND ART

In a telescope, binoculars, a microscope, and other optical apparatus, an objective lens forms a real image and an ocular lens further magnifies the real image for observation. In an ocular lens of this type, aberrations are, of course, required to be satisfactorily corrected over a wide angle of view, and a sufficient eye relief (on-axis distance between lens surface of ocular lens that is closest to a viewer's eye and eye point of ocular lens) is also required for comfortable observation. In general, when an apparent field of view of an ocular lens is increased, however, it is well known that a sufficiently long eye relief is difficult to provide and aberrations associated with light fluxes at the periphery of the visual field, particularly, curvature of field and astigmatism, sharply increase.

To address the problem, for example, an ocular lens including a negative lens group disposed on the object side, a positive lens group disposed on the viewer's eye side, and a field stop disposed therebetween has been disclosed (Patent Literature 1, for example). In the thus configured ocular lens disclosed in Patent Literature 1, disposing the negative lens group on the object side allows a long eye relief to be provided. Further, when the negative lens group has large refracting power (power), the Petzval sum can be reduced, whereby curvature of field is satisfactorily corrected. That is, in an ocular lens of this type, the Petzval sum can be reduced when the ratio of the focal length of the negative lens group on the object side to the focal length of the positive lens group on the viewer's eye side approaches 1:1, and the reduction in the Petzval sum is advantageous in correcting curvature of field and other aberrations.

CITATION LIST

Patent Literature

Patent Literature 1: Japanese Patent Laid-Open No. 6-175047

SUMMARY OF INVENTION

Technical Problem

To design an ocular lens of this type having an apparent field of view of at least 80 degrees and a sufficiently long eye relief, however, the focal length of the positive lens group on the viewer's eye side needs to be long to some extent, which also requires an increase in the focal length of the negative lens group on the object side, resulting in a significant increase in the total length of the ocular lens and insufficient correction of aberrations, particularly, astigmatism at the periphery of the visual field. In view of the fact described above, the apparent field of view can be increased up to only about 60 degrees. Further, to correct aberrations at the periphery of the visual field of an ocular lens of this type, the lens diameter of the positive lens group on the viewer's eye side is inevitably increased, which is practically not preferable. The tendency described above is significant when the overall focal length is long. Further, when the apparent field of view is increased and the overall focal length of the lens group located closer to the object side than the field stop is long, the ocular lens produces a large overall Petzval sum, resulting in insufficient correction of curvature of field and astigmatism.

The present invention has been made in view of the problems described above. An object of the present invention is to provide an ocular lens having aberrations corrected in a satisfactory manner over a sufficiently wide angle of view, having a sufficiently long eye relief with no increase in the total length, and having a lens diameter with little increase. Another object of the present invention is to provide an optical apparatus including the ocular lens.

Solution to Problem

To solve the problems described above, an ocular lens according to the present invention comprises the following lens groups sequentially arranged from an object side: a first lens group having negative refracting power; a second lens group including a lens component having a convex surface facing a viewer's eye side; and a third lens group having positive refracting power. An object-side focal plane of the third lens group is located between the second lens group and the third lens group. The first lens group includes the following lens components sequentially arranged from the object side: a first lens component having a convex surface facing the object side, having negative refracting power, and having a meniscus shape; and a second lens component having negative refracting power. When the ocular lens has an overall focal length $f$ and the first lens group and the second lens group have a combined focal length $f12$, the following condition is satisfied:

$$-35 \leq f12/f \leq -3$$

In the ocular lens described above, when the third lens group has a focal length $f3$, the following condition is preferably satisfied:

$$20 \leq f3 \leq 40$$

In the ocular lens described above, when the second lens group has a focal length $f2$, the following condition is preferably satisfied:

$$5 \leq |f2/f|$$

In the ocular lens described above, the first lens component provided in the first lens group preferably satisfies the following condition when a surface of the first lens component that is closest to an object side has a radius of curvature $Rf$ and a surface of the first lens component that is closest to a viewer's eye side has a radius of curvature $Rr$:

$$1.5 \leq Rf/Rr \leq 10$$

In the ocular lens described above, the first lens component provided in the first lens group preferably satisfies the following condition when the first lens component has N lenses, an i-th lens counted from the object side among the N lenses has a central thickness $di$, and a medium of the i-th lens has a refractive index $ni$ at a d line:

$$0.2 \leq \sum_{i=1}^{N}(di/ni)/f \leq 1.5 \qquad \text{[Expression 1]}$$

In the ocular lens described above, a lens group formed of the first lens group and the second lens group preferably satisfies the following condition when the lens group has M lenses, an i-th lens counted from the object side among the M lenses has a central thickness di, and a medium of the i-th lens has a refractive index ni at a d line:

$$1.0 \leq \sum_{i=1}^{M} (di/ni)/f \leq 2.5 \quad \text{[Expression 2]}$$

In the ocular lens described above, the first lens component provided in the first lens group is preferably a cemented lens.

In the ocular lens described above, the first lens component provided in the first lens group preferably satisfies the following condition when a medium of an object-side lens in the first lens component has an Abbe number ν1 at a d line, and a medium of a viewer's-eye-side lens in the first lens component has an Abbe number ν2 at the d line:

$$3 \leq |\nu 1 - \nu 2| \leq 40$$

In the ocular lens described above, when the second lens group and the third lens group are separated by an on-axis air space D, the following condition is preferably satisfied:

$$1.4 \leq D/f \leq 4.5$$

In the ocular lens described above, the second lens group preferably includes a meniscus lens having a convex surface facing the viewer's eye side.

In the ocular lens described above, at least one surface of the lenses provided in the first lens group, the second lens group, and the third lens group preferably has an aspheric shape.

An optical apparatus according to the invention comprises any of the ocular lenses described above.

Advantageous Effects of Invention

The thus configured present invention can provide an ocular lens having aberrations corrected in a satisfactory manner over a sufficiently wide angle of view, having a sufficiently long eye relief with no increase in the total length, and having a lens diameter with little increase and an optical apparatus including the ocular lens.

DESCRIPTION OF EMBODIMENTS

Figure 1:
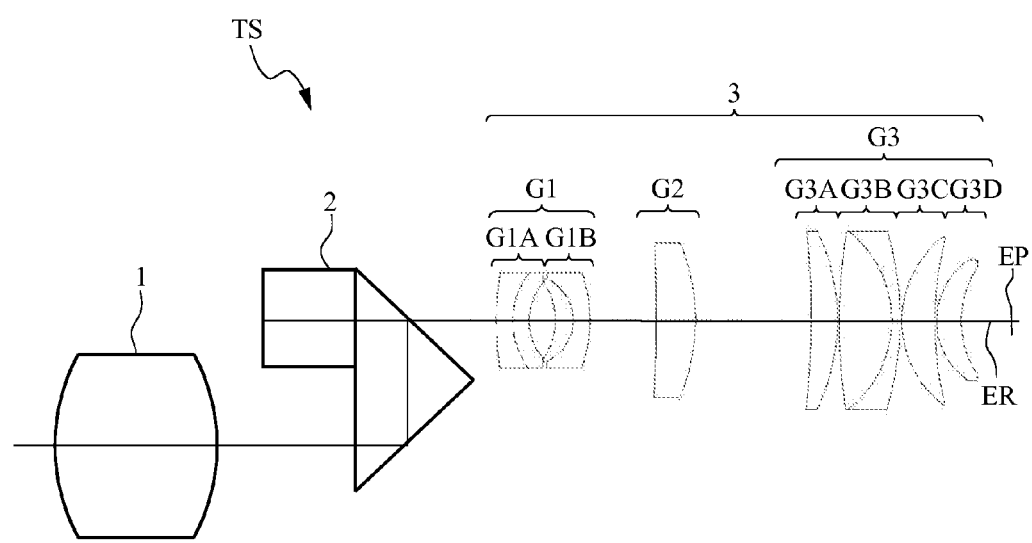
FIG. 1 is a descriptive diagram showing the configuration of an optical apparatus including an ocular lens.

A preferable embodiment of the present invention will be described below with reference to the drawings. The configuration of a telescope optical system TS shown in FIG. 1 will first be described as an optical apparatus including an ocular lens according to the present embodiment. The telescope optical system TS includes an objective lens 1, an erecting prism 2, and an ocular lens 3 sequentially arranged from the observed object side. The erecting prism 2 is disposed between the objective lens 1 and the ocular lens 3 and horizontally and vertically flips the orientation of an inverted image of the observed object formed by the objective lens 1. The erecting prism 2 can be what is called a porro prism, which is formed, for example, of two isosceles triangular prisms. An image of the observed object formed by the objective lens 1 can be enlarged and observed by an observer's eye positioned at an eye point EP through the ocular lens 3. The telescope optical system TS shown in FIG. 1 is presented only by way of example and does not necessarily have the configuration shown in FIG. 1. For example, in an astronomical telescope, which needs no erecting prism 2, the erecting prism 2 can be omitted.

Consider now that the ocular lens 3 described above is formed of a negative lens component, a field stop, and a positive lens component sequentially arranged from the object side. When the on-axis air space between the negative lens component and the positive lens component is increased with the focal length of the negative lens component on the object side fixed, the focal length of the positive lens component can be increased, which advantageously affects the eye relief and the Petzval sum. In this case, however, the total length increases and the lens diameter of the positive lens component sharply increases as the on-axis air space increases. On the other hand, when the on-axis air space is increased with the focal length of the positive lens component fixed, the focal length of the negative lens component increases, which increases the Petzval sum and hence makes it difficult to correct curvature of field and other aberrations.

To address the problem, the ocular lens 3 according to the present embodiment includes a first lens group G1 having negative refracting power as a whole, a second lens group G2 including a lens component having a convex surface facing the viewer's eye side (side where eye point EP is present), and a third lens group G3 having positive refracting power as a whole. In this configuration, the object-side focal plane of the third lens group G3 is located between the second lens group G2 and the third lens group G3, and the ocular lens 3 satisfies the following conditional expressions. The distance from the lens surface of the ocular lens 3 that is closest to the viewer's eye side to the eye point EP along the optical axis is called an "eye relief ER."

A description will now be made of conditions under which the thus configured ocular lens 3 is formed. First, in the present embodiment, when the ocular lens 3 has an overall focal length f and the first lens group G1 and the second lens group G2 have a combined focal length f12, the ocular lens 3 desirably satisfies the following conditional expression (1):

$$-35 \leq f12/f \leq -3 \qquad (1)$$

The conditional expression (1) defines the ratio of the combined focal length f12 of the first lens group G1 and the second lens group G2 to the overall focal length f of the ocular lens 3. When f12/f is smaller than the lower limit of the conditional expression (1), the Petzval sum of the ocular lens 3 increases, resulting in insufficient correction of curvature of field and astigmatism, which is not preferable. To ensure the advantageous effects of the present embodiment, the lower limit of the conditional expression (1) is preferably set at −30. To further ensure the advantageous effects of the present embodiment, the lower limit of the conditional expression (1) is more preferably set at −27. Conversely, when f12/f is greater than the upper limit of the conditional expression (1), the combination of the first lens group G1 and the second lens group G2 provides too much divergence, resulting in an increase in the lens diameter of the third lens group G3, which is not preferable. To ensure the advantageous effects of the present embodiment, the upper limit of the conditional expression (1) is preferably set at −4. To further ensure the advantageous effects of the present embodiment, the upper limit of the conditional expression (1) is more preferably set at −5.1.

Further, when the third lens group G3 has a focal length f3, the ocular lens 3 according to the present embodiment desirably satisfies the following conditional expression (2):

$$20 \leq f3 \leq 40 \tag{2}$$

The conditional expression (2) defines the focal length f3 of the third lens group G3. In general, the eye relief of an ocular lens greatly depends on the focal length of a positive lens component located on the viewer's eye side rather than the field stop. To ensure a sufficiently long eye relief with at least a 90-degree apparent field of view provided and aberrations at the periphery of the visual field corrected, the focal length of the positive lens component on the viewer's eye side needs to be about twice the length of the eye relief. The reason for this is that at least about five lenses are required to sufficiently correct aberrations over a wide angle of view, and that the wide field of view increases the lens diameter and hence the lens central thickness, disadvantageously resulting in a difficulty in providing a sufficient eye relief as compared with a typical ocular lens having an apparent field of view ranging from about 50 to 60 degrees. When f3 is smaller than the lower limit of the conditional expression (2), the eye relief cannot be long enough, which is not preferable. To ensure the advantageous effects of the present embodiment, the lower limit of the conditional expression (2) is preferably set at 22. To further ensure the advantageous effects of the present embodiment, the lower limit of the conditional expression (2) is more preferably set at 24. Conversely, when f3 is greater than the upper limit of the conditional expression (2), the lens diameter of the third lens group G3 increases, which is not preferable. To ensure the advantageous effects of the present embodiment, the upper limit of the conditional expression (2) is preferably set at 35. To further ensure the advantageous effects of the present embodiment, the upper limit of the conditional expression (2) is more preferably set at 33.

An advantageous effect of the second lens group G2 will next be described. In the present embodiment, the second lens group G2 is a lens component having a convex surface facing the viewer's eye side and desirably satisfies the following conditional expression (3) when the second lens group G2 has a focal length f2 and the ocular lens 3 has an overall focal length f:

$$5 \leq |f2/f| \tag{3}$$

The conditional expression (3) defines the ratio of the focal length f2 of the second lens group G2 to the overall focal length f of the ocular lens 3. The ocular lens 3 according to the present embodiment, when it satisfies the conditional expression (3), provides an advantage of suppressing an increase in the lens diameter of the third lens group G3 and reducing the Petzval sum.

The focal length f2 of the second lens group G2 will first be described. The ocular lens 3 according to the present embodiment aims, for example, to prevent the lens diameter of the third lens group G3, in particular, from increasing with a wide apparent field of view ensured. To this end, the second lens group G2 is a lens component having a positive focal length, which can refract a divergent light flux from the first lens group G1 toward the optical axis, whereby the position where the light flux is incident on the third lens group G3 can be lowered.

However, the second lens group G2, which has positive refracting power, can disadvantageously increase the Petzval sum. To address the problem, the lens component that forms the second lens group G2 can be shaped to have a convex surface facing the viewer's eye side, preferably a meniscus shape having the convex surface, which can advantageously reduce the Petzval sum. When the lens component that forms the second lens group G2 has the meniscus shape, the concave surface of the lens component has negative refracting power, which reduces the Petzval sum. Thus, the ocular lens 3 can be configured as a Galilean system. Further, increasing the negative refracting power of the concave surface can enhance the advantageous effect of reducing the Petzval sum. Moreover, orienting the convex surface to face the viewer's eye side allows the principal point of the second lens group G2 to be greatly shifted toward the viewer's eye side, whereby the total length of the ocular lens 3 can also be reduced.

It is, however, noted that the focal length of the second lens group G2 is not necessarily positive in some cases, for example, in a case where the lens diameter of the third lens group G3 does not need to be greatly reduced. In general, when an object is observed with binoculars or any other similar optical apparatus in binocular vision, the interpupillary distance of a wearer (distance between right and left pupils) is an important parameter. Since the interpupillary distance of a wearer typically ranges from about 60 to 70 mm, the distance between the optical axes of the right and left ocular lenses needs to be at least 60 mm as well, and the barrel diameter of each of the ocular lenses needs to satisfy the numerical condition described above.

On the other hand, a telescope and other similar optical apparatus, which allow monocular observation, do not need to take the interpupillary distance into account, and the barrel diameter can be increased to the extent that no practical problem occurs. As described above, it is not always need to reduce the lens diameter of the third lens group G3 by using the positive lens effect of the second lens group G2. In this case, the meniscus-shape lens component can be configured to have an optimum shape with aberrations corrected in a well balanced manner, and the second lens group G2 does not necessarily have a positive focal length but can have no refracting power (power) or a negative focal length.

In this case, however, when the lens diameter of the third lens group G3 is increased to provide an apparent field of view of at least 90 degrees, it is difficult to correct the curvature of field and astigmatism at the periphery of the visual field. It is therefore necessary to suppress the negative refracting power within the range defined by the conditional expression (3).

The ocular lens 3 according to the present embodiment, when it satisfies the conditional expression (3), can prevent the Petzval sum from increasing and suppress an increase in the lens diameter of the third lens group G3 at the same time. When the second lens group G2 has positive refracting power, and |f2/f| is smaller than the lower limit of the conditional expression (3), the Petzval sum increases, resulting in insufficient correction of curvature of field and other aberrations, which is not preferable. On the other hand, when the second lens group G2 has negative refracting power, and |f2/f| is smaller than the lower limit of the conditional expression (3), the light divergence effect of the second lens group G2 is enhanced, which increases the lens diameter of the third lens group G3, resulting in a difficulty in correcting aberrations at the periphery of the visual field, which is not preferable. To ensure the advantageous effects of the present embodiment, the lower limit of the conditional expression (3) is preferably set at 6.

Further, in the ocular lens 3, a first lens component G1A provided in the first lens group G1 desirably satisfies the following conditional expression (4) when the surface of the first lens component G1A that is closest to an object side has a radius of curvature Rf and the surface of the first lens component G1A that is closest to the viewer's eye side has a radius of curvature Rr:

$$1.5 \leq Rf/Rr \leq 10 \quad (4)$$

The conditional expression (4) defines the shape of the first lens component G1A provided in the first lens group G1. When the conditional expression (4) is satisfied, the first lens component G1A is a negative meniscus Galilean system having a convex surface facing the object side and a steep concave surface facing the viewer's eye side. The configuration can reduce the Petzval sum, which is advantageous in correcting curvature of field and astigmatism. Further, the convex surface facing the object side, which is the first lens surface, refracts light fluxes in such a way that the ray height is lowered, advantageously preventing the diameter of each of the following lenses from increasing. When Rf/Rr is smaller than the lower limit of the conditional expression (4), the negative refracting power of the first lens component G1A is not large enough, resulting in insufficient correction of curvature of field and other aberrations, which is not preferable. To ensure the advantageous effects of the present embodiment, the lower limit of the conditional expression (4) is preferably set at 1.7. To further ensure the advantageous effects of the present embodiment, the lower limit of the conditional expression (4) is more preferably set at 1.8. On the other hand, when Rf/Rr is greater than the upper limit of the conditional expression (4), the light divergence effect of the first lens component G1A is conversely enhanced, resulting in an increase in diameter of each of the following lenses and a difficulty in correcting aberrations at the periphery of the visual field, which is not preferable. To ensure the advantageous effects of the present embodiment, the upper limit of the conditional expression (4) is preferably set at 7. To further ensure the advantageous effects of the present embodiment, the upper limit of the conditional expression (4) is preferably set at 6.

Further, in the ocular lens 3, the first lens component G1A provided in the first lens group G1 desirably satisfies the following conditional expression (5) when the first lens component G1A has N lenses (the number of lens elements; each lens element that forms a cemented lens, if any, is counted as one), an i-th lens counted from the object side among the N lenses has a central thickness di, and the medium of the i-th lens has a refractive index ni at the d line:

[Expression 3]

$$0.2 \leq \sum_{i=1}^{N} (di/ni)/f \leq 1.5 \quad (5)$$

The conditional expression (5) defines the central thickness of the first lens component G1A expressed by an optical path length in terms of air space. The effect of the first lens component G1A of lowering the ray height at the periphery of the visual field increases with the lens central thickness. Further, since lowering the ray height allows the negative refracting power of the surface of the first lens component G1A that faces the viewer's eye side to be increased, which is effective in reducing the Petzval sum. When the summation of di/ni over f is smaller than the lower limit of the conditional expression (5), the effect of lowering the peripheral-ray height decreases, resulting in an increase in diameter of each of the following lenses, which is not preferable. To ensure the advantageous effects of the present embodiment, the lower limit of the conditional expression (5) is preferably set at 0.3. To further ensure the advantageous effects of the present embodiment, the lower limit of the conditional expression (5) is more preferably set at 0.4. Conversely, when the summation of di/ni over f is greater than the upper limit of the conditional expression (5), the effect of lowering the peripheral-ray height increases, but the central thickness of the first lens component G1A itself becomes too large, which is disadvantageous and is not preferable in terms of weight and transmittance. To ensure the advantageous effects of the present embodiment, the upper limit of the conditional expression (5) is preferably set at 1.3. To further ensure the advantageous effects of the present embodiment, the upper limit of the conditional expression (5) is more preferably set at 1.1.

Further, in the ocular lens 3, a lens group G12 formed of the first lens group G1 and the second lens group G2 desirably satisfies the following conditional expression (6) when the lens group G12 has M lenses (the number of lens elements), an i-th lens counted from the object side among the M lenses has a central thickness di, and the medium of the i-th lens has a refractive index ni at the d line:

[Expression 4]

$$1.0 \leq \sum_{i=1}^{M} (di/ni)/f \leq 2.5 \quad (6)$$

The conditional expression (6) defines the central thickness of the combination of the first lens group G1 and the second lens group G2 expressed by an optical path length in terms of air space. When the conditional expression (6) is satisfied, an effective total length of the optical system can be shortened, and an optical part located between the objective lens 1 and the ocular lens 3, for example, the erecting prism 2 will not interfere with the ocular lens 3. When the summation of di/ni over f is smaller than the lower limit of the conditional expression (6), the effect of shortening the overall length of the optical system decreases, and the ocular lens 3 may interfere with an optical part or any other components, if any, in front of the ocular lens 3, which is not preferable. To ensure the advantageous effects of the present embodiment, the lower limit of the conditional expression (6) is preferably set at 1.2. To further ensure the advantageous effects of the present embodiment, the lower limit of the conditional expression (6) is more preferably set at 1.3. Conversely, when the summation of di/ni over f is greater than the upper limit of the conditional expression (6), the lens thickness increases, which is disadvantageous and is not preferable in terms of weight and transmittance. To ensure the advantageous effects of the present embodiment, the upper limit of the conditional expression (6) is preferably set at 2.3. To further ensure the advantageous effects of the present embodiment, the upper limit of the conditional expression (6) is more preferably set at 2.1.

In the ocular lens 3, the first lens component G1A provided in the first lens group G1 is desirably a cemented lens and desirably further satisfies the following conditional expression (7). In the following conditional expression (7), v1 represents the Abbe number of the medium of the object-side lens in the first lens component G1A provided in the first lens group G1 at the d line, and v2 represents the Abbe number of the medium of the viewer's-eye-side lens at the d line.

$$3 \leq |v1-v2| \leq 40 \quad (7)$$

The conditional expression (7) defines the Abbe number of the medium of each of the lenses used in the first lens component G1A provided in the first lens group G1. When the first lens component G1A is a cemented lens and satisfies the conditional expression (7), chromatic aberrations, particularly, axial chromatic aberrations can be corrected in a satisfactory manner. In particular, when it is desired to correct chromatic aberrations over a wide wavelength range, for example, in photographic imaging applications, it is important to correct chromatic aberrations by using the first lens component G1A. When a lens group closer to an object, in other words, a lens closer to the objective lens 1 is a cemented lens, axial chromatic aberration is more readily controlled. Further, lateral chromatic aberration at the periphery of the field of view is more difficult to correct as the visual field becomes wider. In view of the fact described above, it is further preferable to form a second lens component G1B with a cemented lens, which not only allows the first lens component G1A and the second lens component G1B to share the chromatic aberration correction and the axial and lateral chromatic aberrations to be corrected also in the wide visual field at the same time but also suppresses astigmatism, coma, and other aberrations at the periphery of the visual field. Correcting the axial chromatic aberration, of course, improves the quality of the visual field, that is, provides a shape image without chromatic aberration in a central portion of the visual field.

When |v1−v2| is smaller than the lower limit of the conditional expression (7), the correction of the axial chromatic aberration is insufficient, which is not preferable. Conversely, when |v1−v2| is greater than the upper limit of the conditional expression (7), the axial chromatic aberration can be corrected, but it is difficult to correct the lateral chromatic aberration and other chromatic aberrations in a well balanced manner. To ensure the advantageous effects of the present embodiment, the upper limit of the conditional expression (7) is preferably set at 30. To further ensure the advantageous effects of the present embodiment, the upper limit of the conditional expression (7) is more preferably set at 20.

Further, the ocular lens 3 desirably satisfies the following conditional expression (8) when the second lens group G2 and the third lens group G3 are separated by an on-axis air space D:

$$1.4 \leq D/f \leq 4.5 \quad (8)$$

The conditional expression (8) defines the on-axis air space D between the second lens group G2 and the third lens group G3. When the conditional expression (8) is satisfied, the compactness of the optical system can be enhanced. When D/f is smaller than the lower limit of the conditional expression (8), the on-axis air space D between the second lens group G2 and the third lens group G3 becomes narrow and each of the two lens groups approaches the image plane, which is not preferable because dust and scratches on the lens surfaces become visible along with an image being observed. To ensure the advantageous effects of the present embodiment, the lower limit of the conditional expression (8) is preferably set at 1.5. Conversely, when D/f is greater than the upper limit of the conditional expression (8), the total length increases and the lens diameter of the third lens group G3 increases, which is not preferable because the compactness is degraded. To ensure the advantageous effects of the present embodiment, the upper limit of the conditional expression (8) is preferably set at 4.

Further, in the ocular lens 3, at least one surface of the lenses provided in the lens groups is desirably an aspheric surface. In this case, the freedom of controlling the amount of distortion is significantly increased, which is effective in correcting astigmatism at the periphery of the visual field.

As described above, when the ocular lens 3 according to the present embodiment is configured as described above, the following advantageous effects are provided: the aberrations are corrected in a satisfactory manner over a sufficiently wide angle of view; a sufficiently long eye relief is provided with no increase in the total length; and an increase in lens diameter is suppressed. In the above description, in which the ocular lens 3 according to the present embodiment is used as the telescope optical system TS, the ocular lens 3 can be used with a microscope optical system.

EXAMPLES

Five Examples of the ocular lens 3 described above will be presented below. FIGS. 2, 4, 6, 8, and 10 show configurations of ocular lenses 3 according to Examples 1 to 5. The ocular lens 3 according to each Example includes a first lens group G1 having negative refracting power, a second lens group G2 including a lens component having a convex surface facing the viewer's eye side, and a third lens group G3 having positive refracting power sequentially arranged from the object side, as shown in FIGS. 2, 4, 6, 8, and 10. An object-side focal plane of the third lens group G3 is located between the second lens group G2 and the third lens group G3. The first lens group G1 includes a first lens component G1A having a convex surface facing the object side, negative refracting power, and a negative meniscus shape and a second lens component G1B having negative refracting power sequentially arranged from the object side. The third lens group G3 includes a single lens (first lens component) G3A having positive refracting power, a cemented lens (second lens component) G3B having positive refracting power, a single lens (third lens component) G3C having positive refracting power, and a single lens (fourth lens component) G3D having positive refracting power sequentially arranged from the object side.

In Example 5, the fourteenth surface is an aspheric surface. In this case, the aspheric surface is expressed by the following Expression (a). In Expression (a), y represents the height in the direction perpendicular to the optical axis, S(y) represents the distance (amount of sag) at the height y along the optical axis from a tangential plane at the vertex of the aspheric surface to the aspheric surface, r represents the radius of curvature (paraxial radius of curvature) of a reference spherical surface, κ represents a conical constant, and An represents an n-th aspheric coefficient. In the following Examples, "E-n" represents "×10$^{-n}$." In Example 5, a secondary aspheric coefficient A2 is zero.

$$S(y)=(y^2/r)/\{1+(1-\kappa \times y^2/r^2)^{1/2}\}+A4\times y^4+A6\times y^6+A8\times y^8+A10\times y^{10} \quad (a)$$

Example 1

Figure 2:
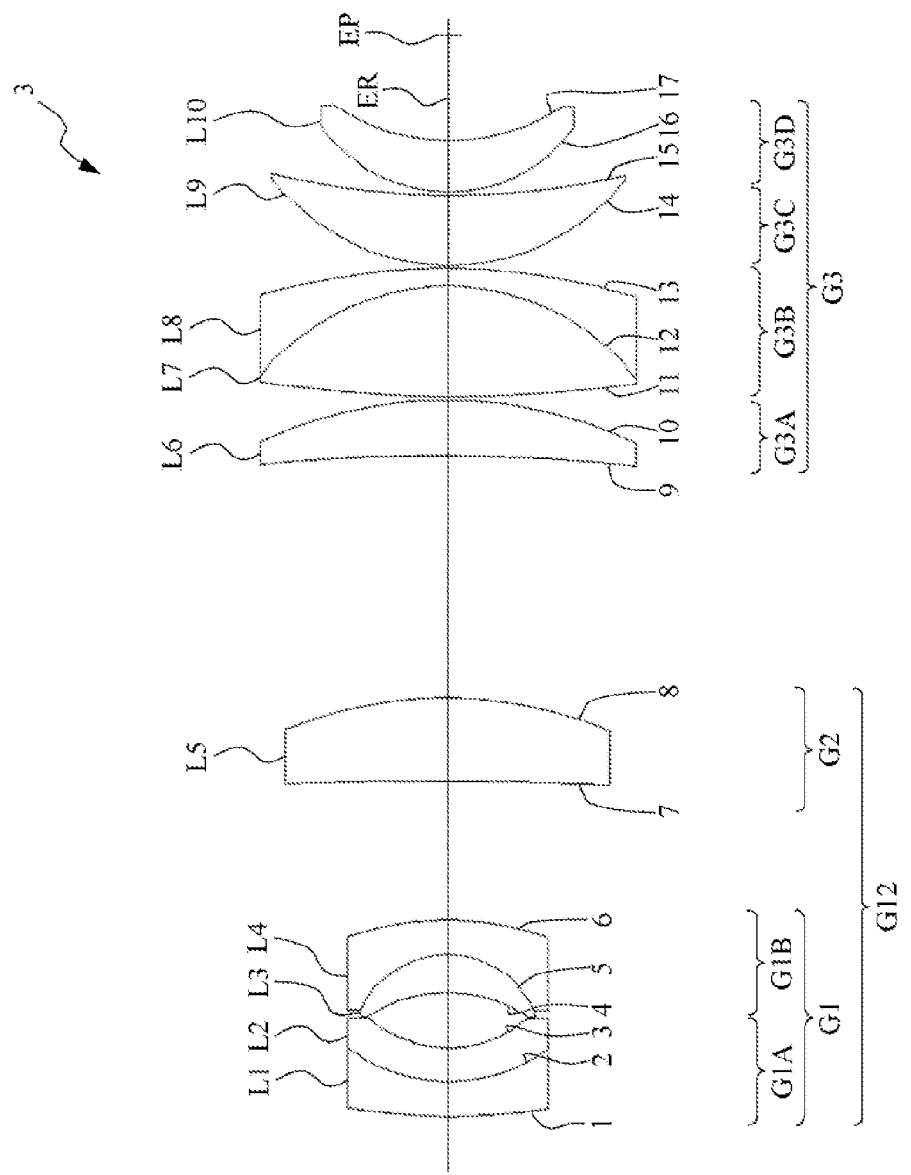
FIG. 2 is a lens configuration diagram showing the configuration of an ocular lens according to Example 1.

FIG. 2 shows an ocular lens 3 according to Example 1. In the ocular lens 3 according to Example 1, the first lens component G1A in the first lens group G1 includes a cemented lens formed of a negative meniscus lens L1 having a convex surface facing the object side and a negative meniscus lens L2 having a convex surface facing the object side sequentially arranged from the object side, and the second lens component G1B includes a cemented lens formed of a positive meniscus lens L3 having a concave surface facing the object side and a negative meniscus lens L4 having a concave surface facing the object side sequentially arranged from the object side. The second lens group G2 includes a positive meniscus lens L5 having a convex surface facing the viewer's eye side. The single lens (first lens component) G3A in the third lens group G3 is formed of a positive meniscus lens L6 having a concave surface facing the object side. The cemented lens (second lens component) G3B is formed of a biconvex lens L7 and a negative meniscus lens L8 having a convex surface facing the viewer's eye side sequentially arranged from the object side. The single lens (third lens component) G3C is formed of a positive meniscus lens L9 having a concave surface facing the viewer's eye side. The single lens (fourth lens component) G3D is formed of a positive meniscus lens L10 having a concave surface facing the viewer's eye side.

Table 1 shown below shows a variety of parameters of the ocular lens 3 according to Example 1 shown in FIG. 2. In Table 1, the first field m shows the number of each optical surface counted from the object side. The second field r shows the radius of curvature of each optical surface. The third field d shows the distance along the optical axis from each optical surface to the following optical surface. The fourth field nd shows the refractive index at the d line (λ=587.6 nm). The fifth field vd shows the Abbe number. Further, f represents the overall focal length of the ocular lens 3, 2ω represents the apparent angular field of view of the ocular lens 3, and ER represents the eye relief. A radius of curvature of 0.000 represents a flat surface, and the refractive index of air of 1.00000 is omitted. Further, in FIG. 2, EP represents the viewer's eye (eye point), and the eye relief ER is the distance along the optical axis from the viewer's eye (eye point EP) to the surface closest to the viewer's eye (seventeenth surface). In each of the conditional expressions, f1 represents the focal length of the first lens group G1, f2 represents the focal length of the second lens group G2, f3 represents the focal length of the third lens group G3, f12 represents the combined focal length of the first lens group G1 and the second lens group G2, Rf represents the radius of curvature of the surface of the first lens component G1A that is closest to an object, Rr represents the radius of curvature of the surface of the first lens component G1A that is closest to the viewer's eye, N represents the number of lenses provided in the first lens component G1A, M represents the number of lenses provided in the first lens group G1 and the second lens group G2, di represents the central thickness of an i-th lens counted from the object side among the N or M lenses, ni represents the refractive index of the i-th lens at the d line, v1 represents the Abbe number of the object-side lens in the first lens component G1A at the d line, v2 represents the Abbe number of the viewer's-eye-side lens in the first lens component G1A at the d line, and D represents the on-axis air space between the second lens group G2 and the third lens group G3. Table 1 further shows values corresponding to the conditional expressions (1) to (8) described above, that is, condition compliant values. The same description holds true for the other Examples.

The units of the radius of curvature, the inter-surface distance, the focal length, and any other length described in all the parameters described below are generally "mm" unless otherwise specified. It is, however, noted that since the same optical performance of an optical system is provided by a proportionally enlarged or reduced optical system, the unit is not limited to "mm" and any other suitable unit can be used.

TABLE 1

[Overall parameters]

f = 12.5
2ω = 100°
ER = 15.3

[Lens data]

| m | r | d | nd | vd |
|---|---|---|---|---|
| 1 | 99.000 | 5.000 | 1.516800 | 64.103 |
| 2 | 26.400 | 5.000 | 1.548140 | 45.793 |
| 3 | 19.800 | 8.000 | | |
| 4 | −23.600 | 5.500 | 1.805182 | 25.346 |
| 5 | −15.300 | 5.000 | 1.640000 | 60.094 |
| 6 | −50.000 | 20.000 | | |
| 7 | −745.000 | 12.000 | 1.729160 | 54.660 |
| 8 | −70.000 | 35.000 | | |
| 9 | −300.000 | 8.000 | 1.729160 | 54.660 |
| 10 | −72.000 | 0.500 | | |
| 11 | 200.000 | 16.000 | 1.640000 | 60.094 |
| 12 | −38.700 | 2.500 | 1.805182 | 25.346 |
| 13 | −109.000 | 0.500 | | |
| 14 | 36.400 | 10.000 | 1.729160 | 54.660 |
| 15 | 118.00 | 0.500 | | |
| 16 | 25.000 | 7.500 | 1.620409 | 60.140 |
| 17 | 34.000 | | | |

[Condition compliant values]

(1) f12/f = −14.3
(2) f3 = 28.3
(3) |f2/f| = 8.4
(4) Rf/Rr = 5
(5) Σ (di/ni)/f = 0.52
(6) Σ (di/ni)/f = 1.6
(7) |v1 − v2| = 18.3
(8) D/f = 2.8

Figure 3:
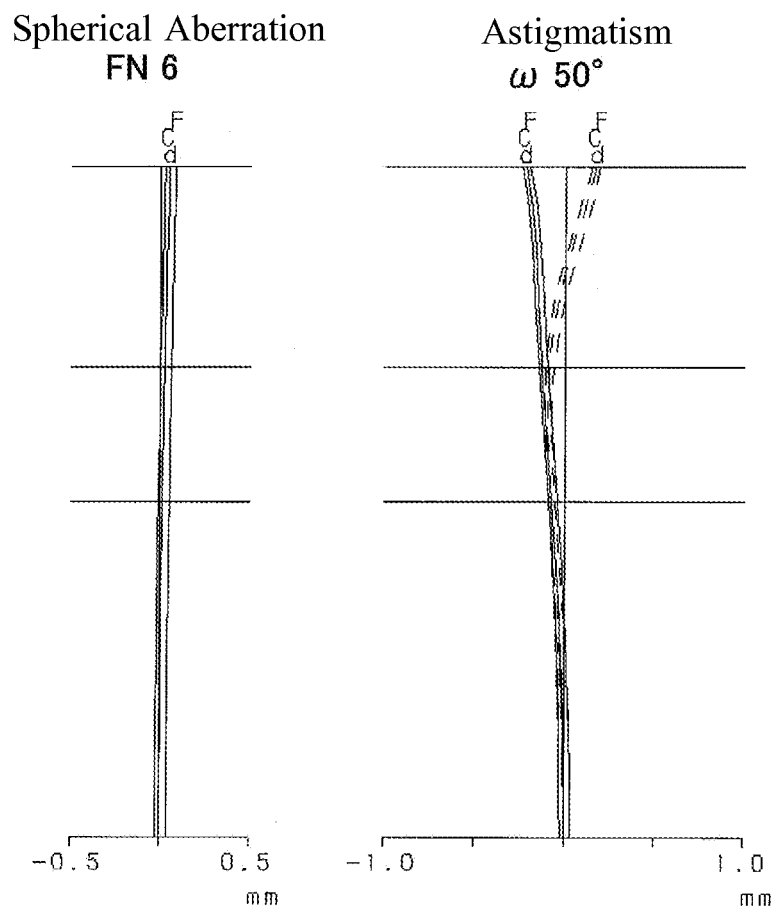
FIG. 3 is aberration diagrams in Example 1 described above.

Table 1 shows that Example 1 satisfies all the conditional expressions (1) to (8) described above. FIG. 3 is aberration diagrams showing spherical aberration and astigmatism associated with rays of the d line (λ=587.6 nm), the F line (λ=486.1 nm), and the C line (λ=656.3 nm) passing through the ocular lens 3 according to Example 1. The aberration diagrams show imaging aberrations produced when light (d line) is incident on the ocular lens 3 from the side the eye point EP is present. In FIG. 3, FN stands for the F-number of the ocular lens 3, and ω represents one-half the apparent angular field of view of the ocular lens 3. The spherical aberration diagram shows the amount of aberration for the F-number, and the astigmatism diagram shows the amount of aberration for the half angle of view ω. In the astigmatism diagram, each solid line represents the sagittal image plane for the corresponding wavelength, and each broken line represents the meridional image plane for the corresponding wavelength.

The above description of the aberration diagrams holds true for the following Examples. As clearly seen from the aberration diagrams shown in FIG. 3, the ocular lens 3 according to Example 1 does not have a long total length but has an eye relief ER sufficiently long with respect to the overall focal length f and provides excellent imaging performance with the aberrations corrected in a satisfactory manner although a sufficiently wide apparent field of view is provided.

Example 2

Figure 4:
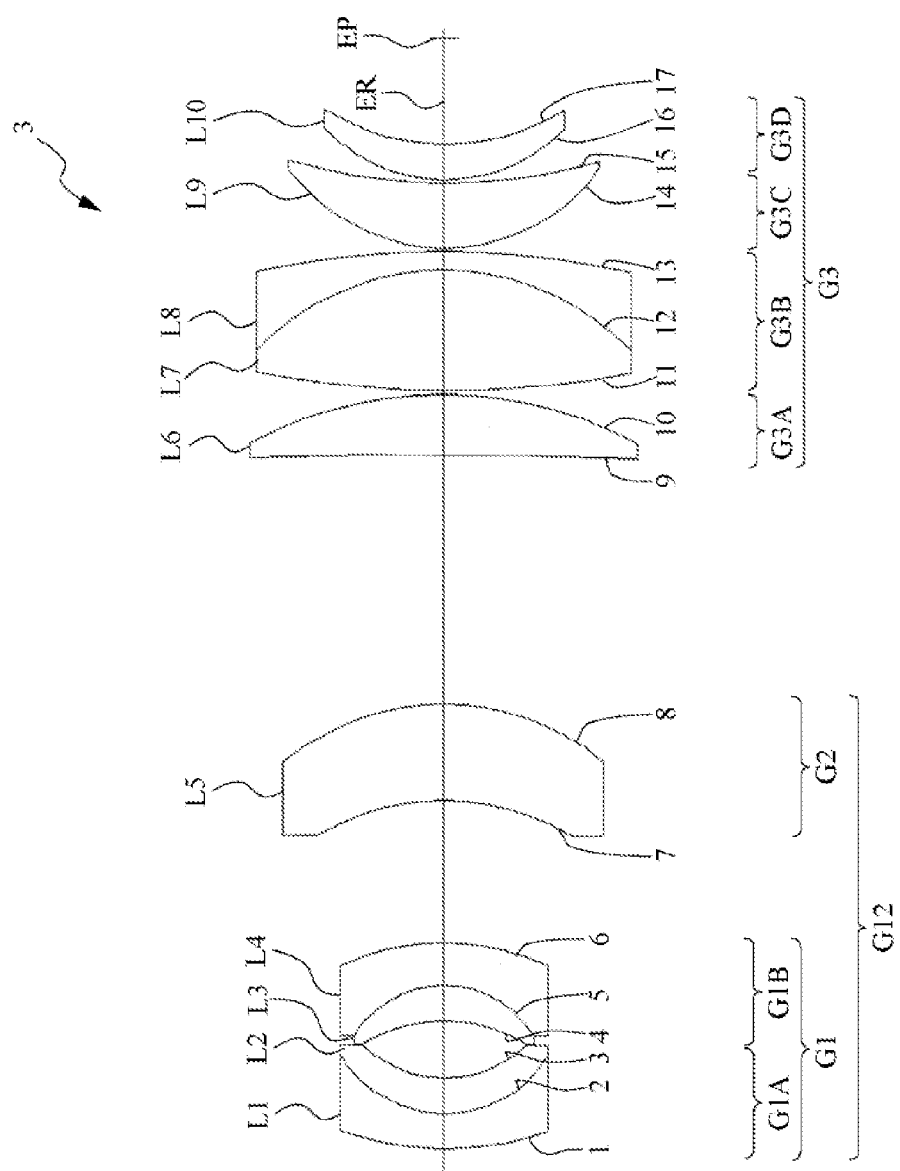
FIG. 4 is a lens configuration diagram showing the configuration of an ocular lens according to Example 2.

FIG. 4 shows an ocular lens 3 according to Example 2. In the ocular lens 3 according to Example 2, the first lens component G1A in the first lens group G1 includes a cemented lens formed of a negative meniscus lens L1 having a convex surface facing the object side and a positive meniscus lens L2 having a convex surface facing the object side sequentially arranged from the object side, and the second lens component G1B includes a cemented lens formed of a positive meniscus lens L3 having a concave surface facing the object side and a negative meniscus lens L4 having a concave surface facing the object side sequentially arranged from the object side. The second lens group G2 includes a positive meniscus lens L5 having a convex surface facing the viewer's eye side. The single lens (first lens component) G3A in the third lens group G3 is formed of a positive meniscus lens L6 having a concave surface facing the object side. The cemented lens (second lens component) G3B is formed of a biconvex lens L7 and a negative meniscus lens L8 having a convex surface facing the viewer's eye side sequentially arranged from the object side. The single lens (third lens component) G3C is formed of a positive meniscus lens L9 having a concave surface facing the viewer's eye side. The single lens (fourth lens component) G3D is formed of a positive meniscus lens L10 having a concave surface facing the viewer's eye side.

Table 2 shown below shows a variety of parameters of the ocular lens 3 according to Example 2 shown in FIG. 4.

TABLE 2

[Overall parameters]

f = 12.5
2ω = 100°
ER = 14.9

[Lens data]

| m | r | d | nd | νd |
|---|---|---|---|---|
| 1 | 48.700 | 5.000 | 1.516800 | 64.103 |
| 2 | 18.900 | 5.000 | 1.548140 | 45.793 |
| 3 | 18.700 | 8.000 | | |
| 4 | −25.200 | 5.000 | 1.805182 | 25.346 |
| 5 | −16.500 | 6.000 | 1.640000 | 60.094 |
| 6 | −40.000 | 20.000 | | |
| 7 | −39.000 | 13.500 | 1.729160 | 54.660 |
| 8 | −40.000 | 35.000 | | |
| 9 | −1000.000 | 8.500 | 1.729160 | 54.660 |
| 10 | −65.000 | 0.500 | | |
| 11 | 161.000 | 17.000 | 1.640000 | 60.094 |
| 12 | −40.000 | 2.500 | 1.805182 | 25.346 |
| 13 | −138.000 | 0.500 | | |
| 14 | 30.000 | 9.000 | 1.729160 | 54.660 |
| 15 | 85.000 | 0.500 | | |
| 16 | 26.000 | 5.000 | 1.620409 | 60.140 |
| 17 | 35.000 | | | |

TABLE 2-continued

[Condition compliant values]

(1) f12/f = −8.2
(2) f3 = 27.2
(3) |f2/f| = 36.5
(4) Rf/Rr = 2.6
(5) Σ (di/ni)/f = 0.52
(6) Σ (di/ni)/f = 1.7
(7) |ν1 − ν2| = 18.3
(8) D/f = 2.8

Figure 5:
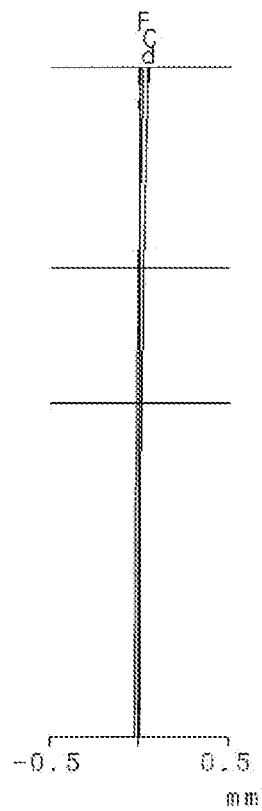
FIG. 5 is aberration diagrams in Example 2 described above.
Figure 5:
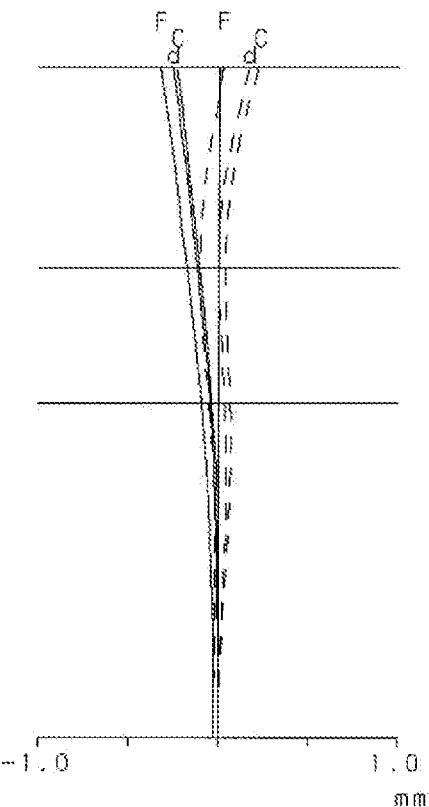

Table 2 shows that Example 2 satisfies all the conditional expressions (1) to (8) described above. FIG. 5 is aberration diagrams showing spherical aberration and astigmatism associated with rays of the d line, the F line, and the C line passing through the ocular lens 3 according to Example 2. As clearly seen from the aberration diagrams shown in FIG. 5, the ocular lens 3 according to Example 2 does not have a long total length but has an eye relief ER sufficiently long with respect to the overall focal length f and provides excellent imaging performance with the aberrations corrected in a satisfactory manner although a sufficiently wide apparent field of view is provided.

Example 3

Figure 6:
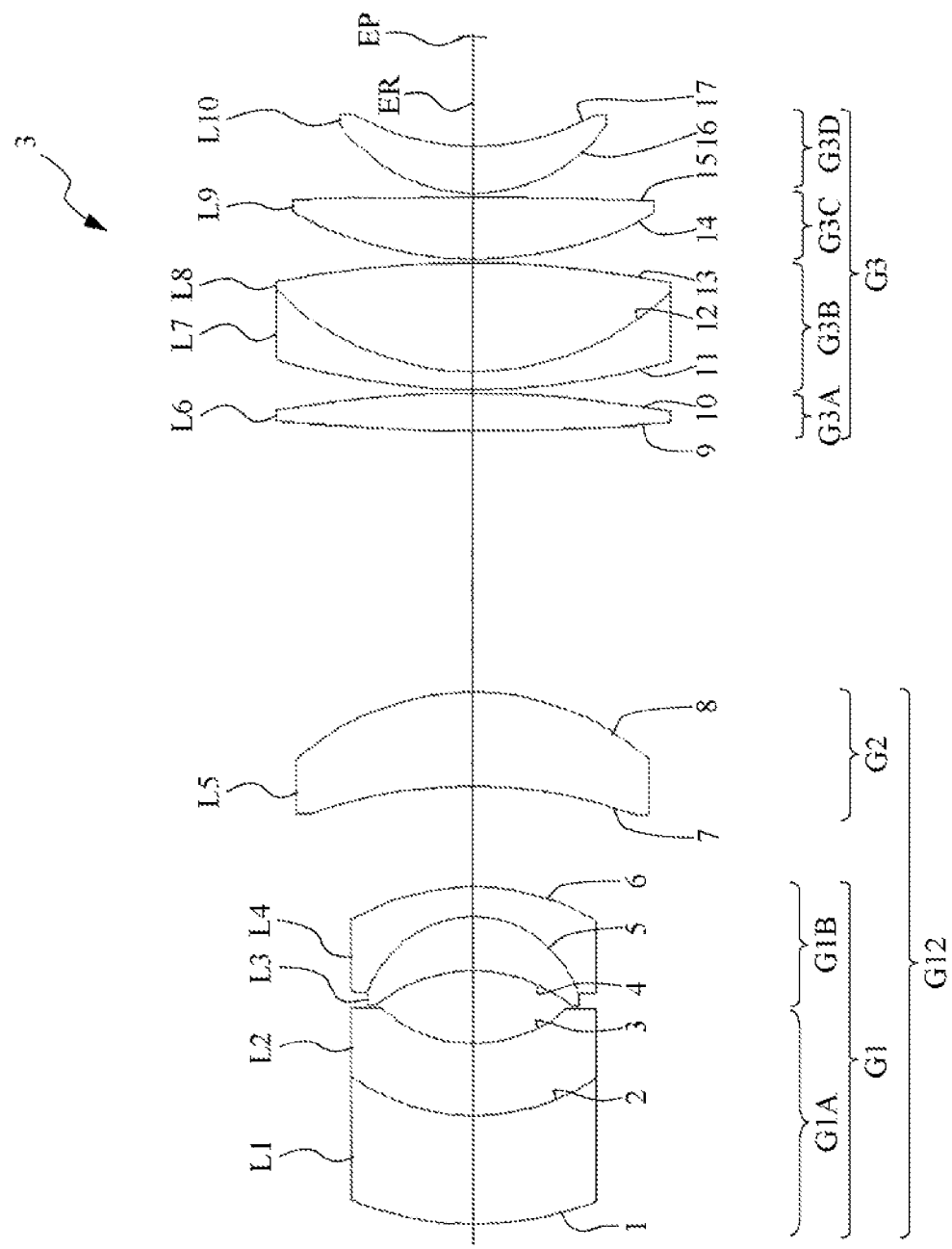
FIG. 6 is a lens configuration diagram showing the configuration of an ocular lens according to Example 3.

FIG. 6 shows an ocular lens 3 according to Example 3. In the ocular lens 3 according to Example 3, the first lens component G1A in the first lens group G1 includes a cemented lens formed of a negative meniscus lens L1 having a convex surface facing the object side and a negative meniscus lens L2 having a convex surface facing the object side sequentially arranged from the object side, and the second lens component G1B includes a cemented lens formed of a positive meniscus lens L3 having a concave surface facing the object side and a negative meniscus lens L4 having a concave surface facing the object side sequentially arranged from the object side. The second lens group G2 includes a positive meniscus lens L5 having a convex surface facing the viewer's eye side. The single lens (first lens component) G3A in the third lens group G3 is formed of a biconvex lens L6. The cemented lens (second lens component) G3B is formed of a negative meniscus lens L7 having a concave surface facing the viewer's eye side and a biconvex lens L8 sequentially arranged from the object side. The single lens (third lens component) G3C is formed of a biconvex lens L9. The single lens (fourth lens component) G3D is formed of a positive meniscus lens L10 having a concave surface facing the viewer's eye side.

Table 3 shown below shows a variety of parameters of the ocular lens 3 according to Example 3 shown in FIG. 6.

TABLE 3

[Overall parameters]

f = 17.5
2ω = 100°
ER = 15.1

[Lens data]

| m | r | d | nd | νd |
|---|---|---|---|---|
| 1 | 51.500 | 15.000 | 1.755000 | 52.285 |
| 2 | 33.400 | 10.000 | 1.801000 | 34.963 |
| 3 | 21.500 | 10.000 | | |
| 4 | −24.100 | 7.500 | 1.805182 | 25.346 |
| 5 | −16.700 | 4.000 | 1.729160 | 54.660 |
| 6 | −38.000 | 14.000 | | |

TABLE 3-continued

| | | | | |
|---|---|---|---|---|
| 7 | −75.000 | 13.000 | 1.640000 | 60.094 |
| 8 | −40.800 | 36.000 | | |
| 9 | 400.000 | 5.000 | 1.729160 | 54.660 |
| 10 | −181.000 | 0.500 | | |
| 11 | 106.000 | 2.500 | 1.805182 | 25.346 |
| 12 | 43.200 | 15.000 | 1.640000 | 60.094 |
| 13 | −160.000 | 0.500 | | |
| 14 | 58.000 | 8.500 | 1.729160 | 54.660 |
| 15 | −960.000 | 0.500 | | |
| 16 | 25.000 | 6.500 | 1.620409 | 60.140 |
| 17 | 37.000 | | | |

[Condition compliant values]

(1) f12/f = −22.5
(2) f3 = 29.6
(3) |f2/f| = 7.0
(4) Rf/Rr = 2.4
(5) Σ (di/ni)/f = 0.81
(6) Σ (di/ni)/f = 1.6
(7) |ν1 − ν2| = 17.3
(8) D/f = 2.1

Figure 7:
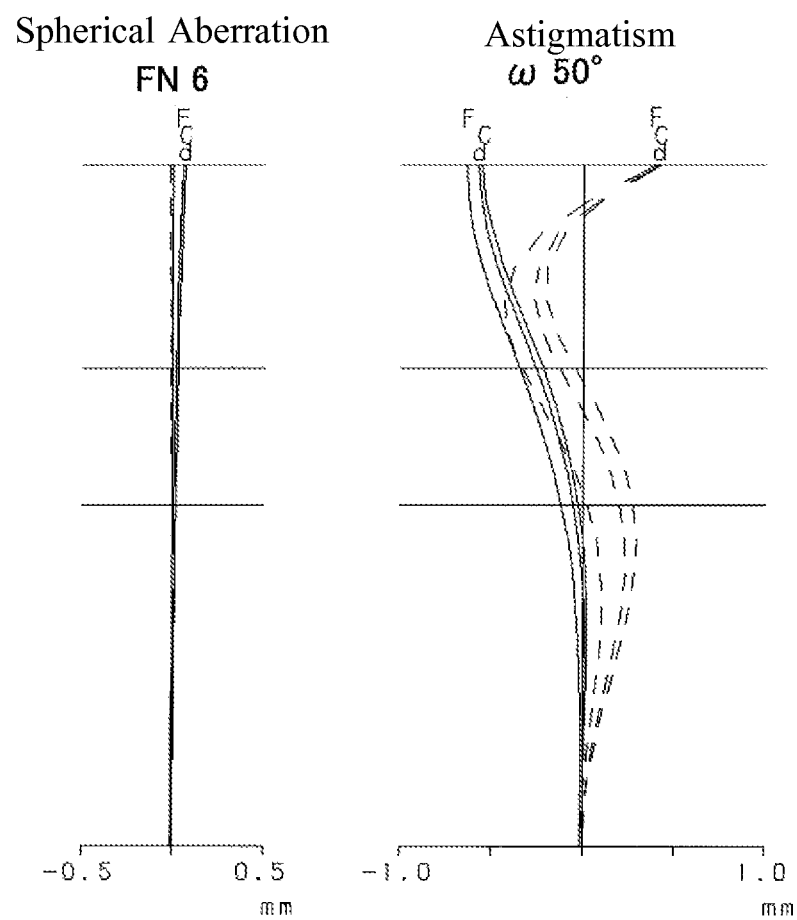
FIG. 7 is aberration diagrams in Example 3 described above.

Table 3 shows that Example 3 satisfies all the conditional expressions (1) to (8) described above. FIG. 7 is aberration diagrams showing spherical aberration and astigmatism associated with rays of the d line, the F line, and the C line passing through the ocular lens 3 according to Example 3. As clearly seen from the aberration diagrams shown in FIG. 7, the ocular lens 3 according to Example 3 does not have a long total length but has an eye relief ER sufficiently long with respect to the overall focal length f and provides excellent imaging performance with the aberrations corrected in a satisfactory manner although a sufficiently wide apparent field of view is provided.

Example 4

Figure 8:
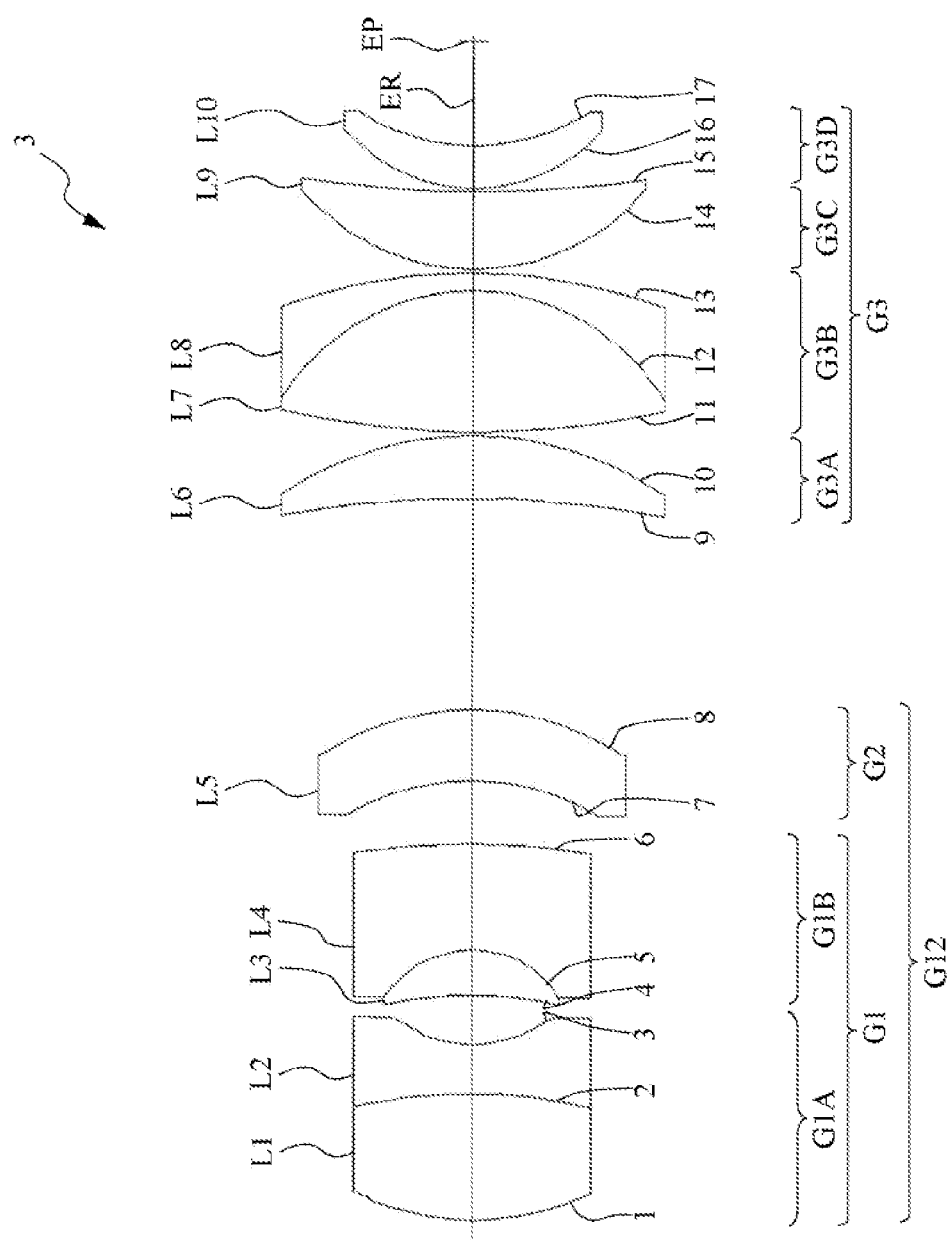
FIG. 8 is a lens configuration diagram showing the configuration of an ocular lens according to Example 4.

FIG. 8 shows an ocular lens 3 according to Example 4. In the ocular lens 3 according to Example 4, the first lens component G1A in the first lens group G1 includes a cemented lens formed of a biconvex lens L1 and a biconcave lens L2 sequentially arranged from the object side, and the second lens component G1B includes a cemented lens formed of a positive meniscus lens L3 having a concave surface facing the object side and a negative meniscus lens L4 having a concave surface facing the object side sequentially arranged from the object side. The second lens group G2 includes a negative meniscus lens L5 having a convex surface facing the viewer's eye side. The single lens (first lens component) in the third lens group G3 is formed of a positive meniscus lens L6 having a concave surface facing the object side. The cemented lens (second lens component) G3B is formed of a biconvex lens L7 and a negative meniscus lens L8 having a convex surface facing the viewer's eye side sequentially arranged from the object side. The single lens (third lens component) G3C is formed of a positive meniscus lens L9 having a concave surface facing the viewer's eye side. The single lens (fourth lens component) G3D is formed of a positive meniscus lens L10 having a concave surface facing the viewer's eye side.

Table 4 shown below shows a variety of parameters of the ocular lens 3 according to Example 4 shown in FIG. 8.

TABLE 4

[Overall parameters]

f = 16.9
2ω = 100°
ER = 14.8

[Lens data]

| m | r | d | nd | νd |
|---|---|---|---|---|
| 1 | 43.800 | 18.000 | 1.755000 | 52.285 |
| 2 | −82.300 | 7.000 | 1.762000 | 40.105 |
| 3 | 20.500 | 7.000 | | |
| 4 | −64.400 | 6.500 | 1.805182 | 25.346 |
| 5 | −16.300 | 15.000 | 1.755000 | 52.285 |
| 6 | −120.000 | 9.000 | | |
| 7 | −39.000 | 10.000 | 1.640000 | 60.094 |
| 8 | −44.000 | 30.000 | | |
| 9 | −171.700 | 9.000 | 1.729160 | 54.660 |
| 10 | −53.800 | 0.500 | | |
| 11 | 141.000 | 20.000 | 1.640000 | 60.094 |
| 12 | −35.000 | 2.500 | 1.805182 | 25.346 |
| 13 | −89.300 | 0.500 | | |
| 14 | 35.700 | 11.000 | 1.729160 | 54.660 |
| 15 | 186.000 | 0.500 | | |
| 16 | 27.200 | 6.000 | 1.620409 | 60.140 |
| 17 | 33.300 | | | |

[Condition compliant values]

(1) f12/f = −5.3
(2) f3 = 26.5
(3) |f2/f| = 144.6
(4) Rf/Rr = 2.1
(5) Σ (di/ni)/f = 0.84
(6) Σ (di/ni)/f = 1.9
(7) |ν1 − ν2| = 12.2
(8) D/f = 1.8

Figure 9:
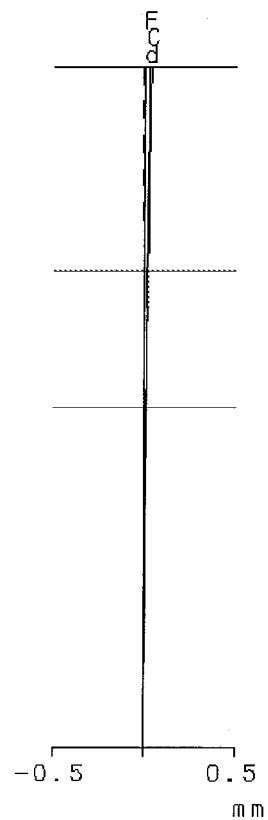
FIG. 9 is aberration diagrams in Example 4 described above.
Figure 9:
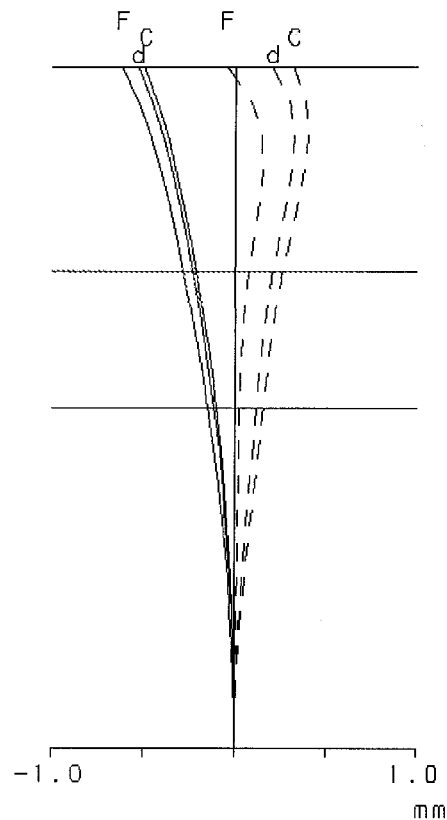

Table 4 shows that Example 4 satisfies all the conditional expressions (1) to (8) described above. FIG. 9 is aberration diagrams showing spherical aberration and astigmatism associated with rays of the d line, the F line, and the C line passing through the ocular lens 3 according to Example 4. As clearly seen from the aberration diagrams shown in FIG. 9, the ocular lens 3 according to Example 4 does not have a long total length but has an eye relief ER sufficiently long with respect to the overall focal length f and provides excellent imaging performance with the aberrations corrected in a satisfactory manner although a sufficiently wide apparent field of view is provided.

Example 5

Figure 10:
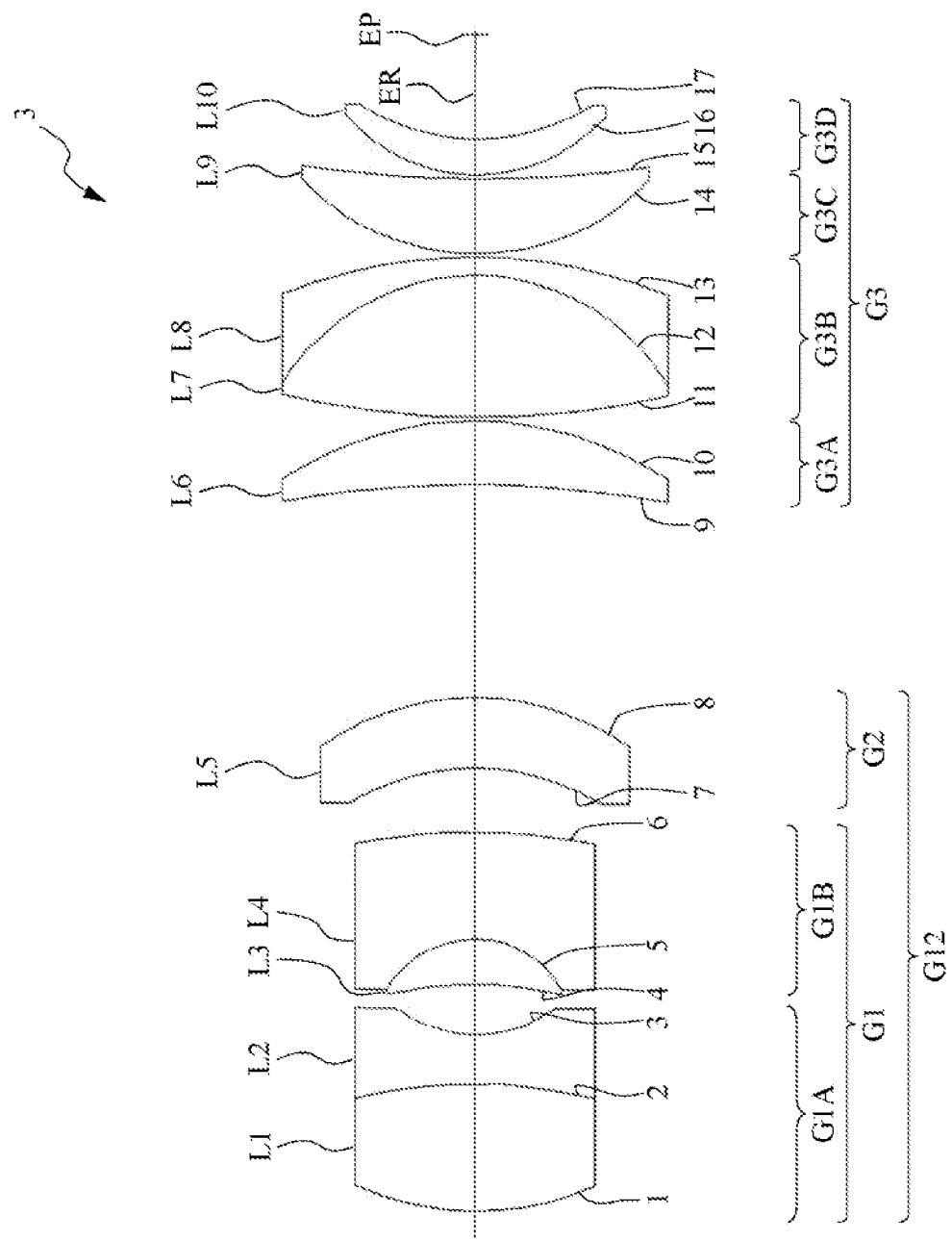
FIG. 10 is a lens configuration diagram showing the configuration of an ocular lens according to Example 5.

FIG. 10 shows an ocular lens 3 according to Example 5. In the ocular lens 3 according to Example 5, the first lens component G1A in the first lens group G1 includes a cemented lens formed of a biconvex lens L1 and a biconcave lens L2 sequentially arranged from the object side, and the second lens component G1B includes a cemented lens formed of a positive meniscus lens L3 having a concave surface facing the object side and a negative meniscus lens L4 having a concave surface facing the object side sequentially arranged from the object side. The second lens group G2 includes a positive meniscus lens L5 having a convex surface facing the viewer's eye side. The single lens (first lens component) in the third lens group G3 is formed of a positive meniscus lens L6 having a concave surface facing the object side. The cemented lens (second lens component) G3B is formed of a biconvex lens L7 and a negative meniscus lens L8 having a convex surface facing the viewer's eye side sequentially arranged from the object side. The single lens (third lens component) G3C is formed of a positive meniscus lens L9 having a concave surface facing the viewer's eye side and an aspheric surface facing the object side. The single lens (fourth lens component) G3D is formed of a positive meniscus lens L10 having a concave surface facing the viewer's eye side.

Table 5 shown below shows a variety of parameters of the ocular lens 3 according to Example 5 shown in FIG. 10.

TABLE 5

[Overall parameters]

f = 16.9
2ω = 100°
ER = 14.8

[Lens data]

| m | r | d | nd | vd |
|---|---|---|---|---|
| 1 | 46.800 | 18.000 | 1.755000 | 52.285 |
| 2 | −82.300 | 7.000 | 1.762000 | 40.105 |
| 3 | 20.700 | 7.000 | | |
| 4 | −59.100 | 6.500 | 1.805182 | 25.346 |
| 5 | −15.800 | 15.000 | 1.755000 | 52.285 |
| 6 | −100.000 | 9.000 | | |
| 7 | −39.000 | 10.000 | 1.640000 | 60.094 |
| 8 | −42.000 | 30.000 | | |
| 9 | −171.700 | 9.000 | 1.729160 | 54.660 |
| 10 | −54.800 | 0.500 | | |
| 11 | 141.000 | 20.000 | 1.640000 | 60.094 |
| 12 | −35.000 | 2.500 | 1.805182 | 25.346 |
| 13 | −83.400 | 0.500 | | |
| 14 | 38.600 | 10.500 | 1.729160 | 54.660 (aspheric surface) |
| 15 | 196.000 | 0.500 | | |
| 16 | 27.200 | 5.000 | 1.620409 | 60.140 |
| 17 | 33.300 | | | |

[Aspheric surface data]
The conical constant κ and the aspheric constants A4 to A10 of the fourteenth surface are shown below.

| | κ | A4 | A6 | A8 | A10 |
|---|---|---|---|---|---|
| Fourteenth surface | 0.0000 | 0.17E−05 | 0.24E−08 | 0.00E+00 | 0.70E−15 |

[Condition compliant values]

(1) f12/f = −5.4
(2) f3 = 27.5
(3) |f2/f| = 167.8
(4) Rf/Rr = 2.3
(5) Σ (di/ni)/f = 0.84
(6) Σ (di/ni)/f = 1.9
(7) |ν1 − ν2| = 12.2
(8) D/f = 1.8

Figure 11:
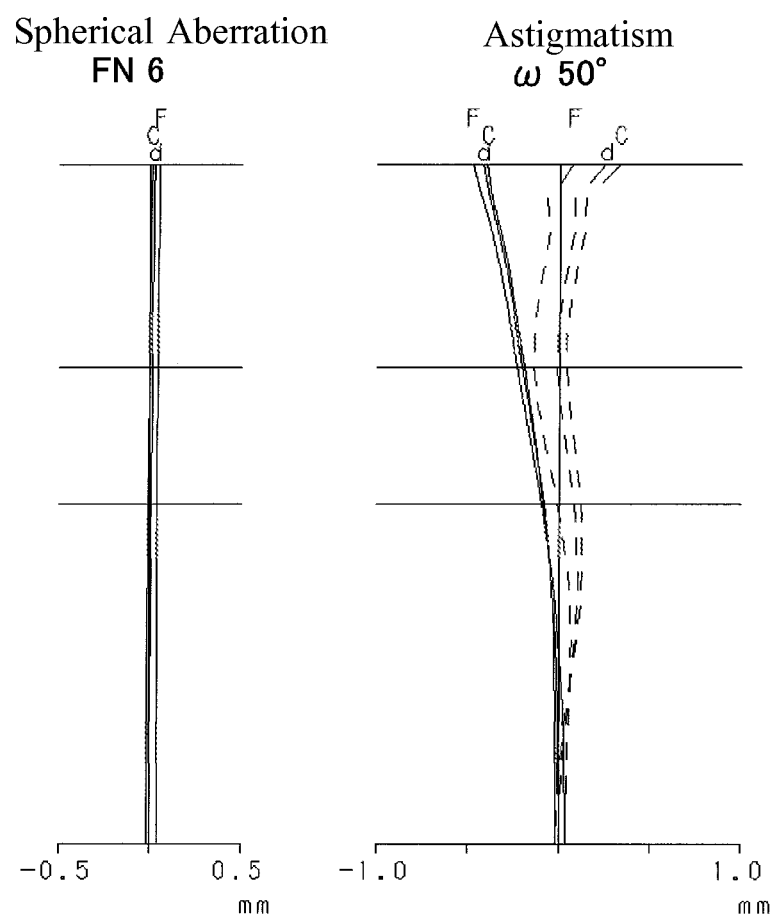
FIG. 11 is aberration diagrams in Example 5 described above.

Table 5 shows that Example 5 satisfies all the conditional expressions (1) to (8) described above. FIG. 11 is aberration diagrams showing spherical aberration and astigmatism associated with rays of the d line, the F line, and the C line passing through the ocular lens 3 according to Example 5. As clearly seen from the aberration diagrams shown in FIG. 11, the ocular lens 3 according to Example 5 does not have a long total length but has an eye relief ER sufficiently long with respect to the overall focal length f and provides excellent imaging performance with the aberrations corrected in a satisfactory manner although a sufficiently wide apparent field of view is provided.

The ocular lens 3 according to the present application only needs to satisfy the conditions described above and is, of course, not limited to the lens configurations in Examples 1 to 5.

| Reference Signs List | |
|---|---|
| 3: | Ocular lens |
| G1: | First lens group |
| G1A: | First lens component |
| G1B: | Second lens component (G1A and G1B form first lens group) |
| G2: | Second lens group |
| G3: | Third lens group |
| G3A: | First lens component |
| G3B: | Second lens component |
| G3C: | Third lens component |
| G3D: | Fourth lens component (G3A, G3B, G3C, and G3D form third lens group) |
| TS: | Telescope optical system (optical apparatus) |

The invention claimed is:

1. An ocular lens comprising the following lens groups sequentially arranged from an object side:
   a first lens group having negative refracting power;
   a second lens group including a lens component having a convex surface facing a viewer's eye side; and
   a third lens group having positive refracting power,
   wherein an object-side focal plane of the third lens group is located between the second lens group and the third lens group,
   the first lens group includes the following lens components sequentially arranged from the object side:
   a first lens component having a convex surface facing the object side, having negative refracting power, and having a meniscus shape; and
   a second lens component having negative refracting power, and
   when the ocular lens has an overall focal length f and the first lens group and the second lens group have a combined focal length f12, the following condition is satisfied:

$-35 \leq f12/f \leq -3$.

2. The ocular lens according to claim 1,
   wherein when the third lens group has a focal length f3, the following condition is satisfied:

$20 \leq f3 \leq 40$.

3. The ocular lens according to claim 1,
   wherein when the second lens group has a focal length f2, the following condition is satisfied:

$5 \leq |f2/f|$.

4. The ocular lens according to claim 1,
   wherein the first lens component provided in the first lens group satisfies the following condition when a surface of the first lens component that is closest to an object side has a radius of curvature Rf and a surface of the first lens component that is closest to a viewer's eye side has a radius of curvature Rr:

$1.5 \leq Rf/Rr \leq 10.0$.

5. The ocular lens according to claim 1,
   wherein the first lens component provided in the first lens group satisfies the following condition when the first lens component has N lenses, an i-th lens counted from the object side among the N lenses has a central thickness di, and a medium of the i-th lens has a refractive index ni at a d line:

$$0.2 \leq \sum_{i=1}^{N} (di/ni)/f \leq 1.5.$$ [Expression 5]

6. The ocular lens according to claim 1, wherein a lens group formed of the first lens group and the second lens group satisfies the following condition when the lens group has M lenses, an i-th lens counted from the object side among the M lenses has a central thickness di, and a medium of the i-th lens has a refractive index ni at a d line:

$$1.0 \leq \sum_{i=1}^{M} (di/ni)/f \leq 2.5.$$ [Expression 6]

7. The ocular lens according to claim 1, wherein the first lens component provided in the first lens group is a cemented lens.

8. The ocular lens according to claim 1, wherein the first lens component provided in the first lens group satisfies the following condition when a medium of an object-side lens in the first lens component has an Abbe number ν1 at a d line, and a medium of a viewer's-eye-side lens in the first lens component has an Abbe number ν2 at the d line:

$3 \leq |\nu 1 - \nu 2| \leq 40.$

9. The ocular lens according to claim 1, wherein when the second lens group and the third lens group are separated by an on-axis air space D, the following condition is satisfied:

$1.4 \leq D/f \leq 4.5.$

10. The ocular lens according to claim 1, wherein the second lens group includes a meniscus lens having a convex surface facing the viewer's eye side.

11. The ocular lens according to claim 1, wherein at least one surface of the lenses provided in the first lens group, the second lens group, and the third lens group has an aspheric shape.

12. An optical apparatus comprising the ocular lens according to claim 1.

* * * * *